J. W. BILLINGS.
DESCRIPTIVE FILM ATTACHMENT AND SYNCHRONIZING MECHANISM.
APPLICATION FILED AUG. 9, 1915.
1,190,370.
Patented July 11, 1916.
2 SHEETS—SHEET 1.
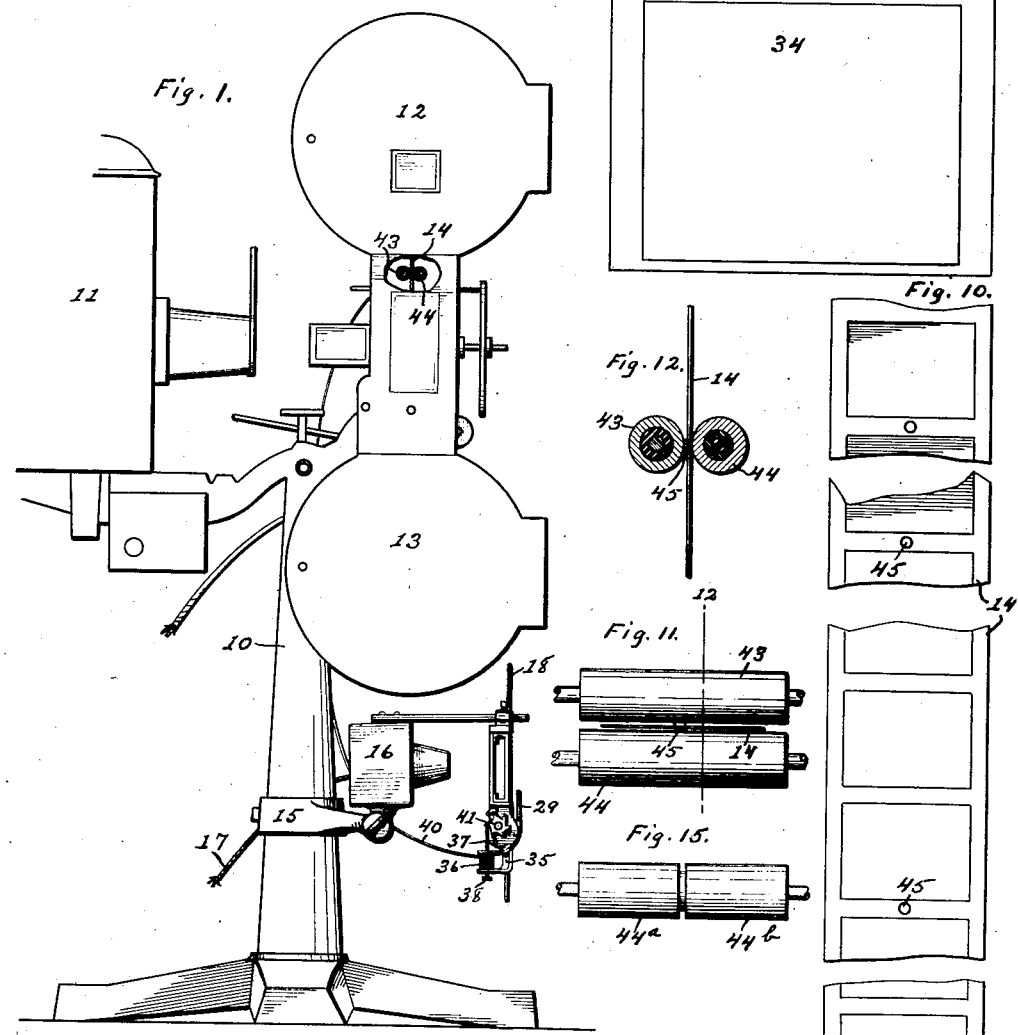
INVENTOR
J. W. BILLINGS
By Earl M. Sinclair
Attorney.
WITNESSES

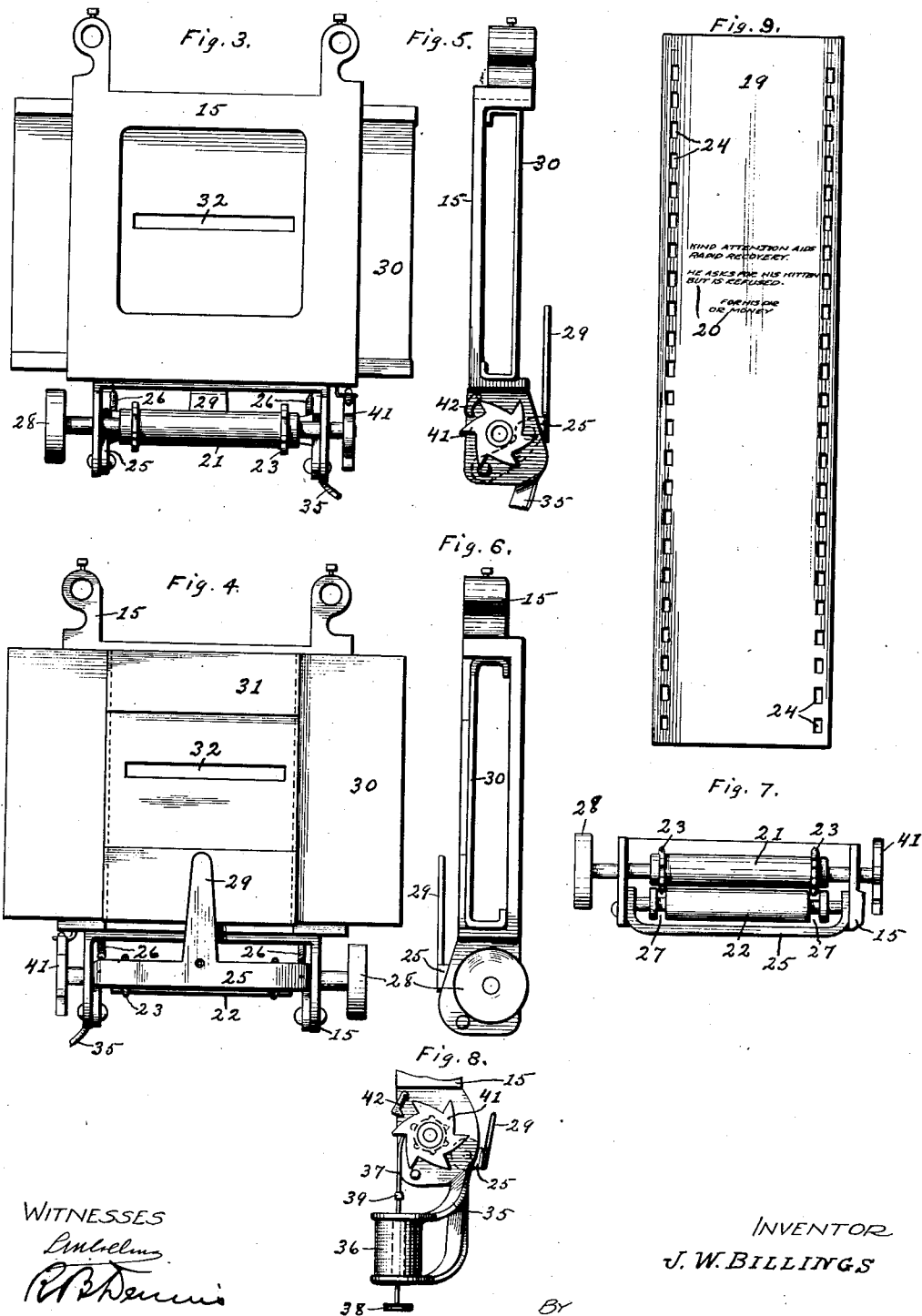

UNITED STATES PATENT OFFICE.

JOHN W. BILLINGS, OF UNION, IOWA.

DESCRIPTIVE-FILM ATTACHMENT AND SYNCHRONIZING MECHANISM.

1,190,370.  Specification of Letters Patent.  Patented July 11, 1916.

Application filed August 9, 1915.  Serial No. 44,421.

*To all whom it may concern:*

Be it known that I, JOHN W. BILLINGS, a citizen of the United States of America, and resident of Union, Hardin county, Iowa, have invented a new and useful Descriptive-Film Attachment and Synchronizing Mechanism, of which the following is a specification.

The object of this invention is to provide an improved attachment for moving picture projecting machines whereby successive items of descriptive or other matter relating to the picture being shown may be thrown on the screen independently of the main film and apparatus and yet synchronized thereto, and without interfering with the continuous operation of the main film.

A further object of this invention is to provide improved mechanism operated by the travel of the main or picture film for advancing the descriptive film.

A further object of this invention is to provide an electrically operated synchronizing system, adapted to be actuated at successive and selected intervals by the travel of the main film, for controlling the operation of a supplementary device such as a descriptive film or a phonograph.

My invention consists in the construction, arrangement and combination of elements hereinafter set forth, pointed out in my claims and illustrated by the accompanying drawing, in which—

Figure 1 is a side elevation of a portion of a moving picture projector equipped with my improved descriptive film attachment. Fig. 2 is a view of the screen illustrating one arrangement of the descriptive matter relative to the picture. Fig. 3 is a rear elevation, Fig. 4 a front elevation, Figs. 5 and 6 opposite end elevations, and Fig. 7 a bottom plan, of part of the mechanism for carrying and traveling the supplementary or descriptive film. Fig. 8 is a detail elevation of the mechanism for stepping forward the descriptive film, as controlled by the travel of the main film. Fig. 9 is an elevation of the descriptive film. Figs. 3 to 9 inclusive are on a scale enlarged relative to Fig. 1. Fig. 10 is an outline representing the main or picture film with the contact points for electrically controlling the travel of the supplementary device. Fig. 11 is a detail plan of the contact rollers through which the main film travels, and Fig. 12 is a cross-section on the line 12—12 of Fig. 11.

Fig. 13 is a diagrammatic representation of the electrical connections employed. Fig. 14 is an outline of the main film as adapted for the control of two supplementary devices. Fig. 15 is an elevation of one of the contact rollers employed for the main film when so constructed and arranged. Fig. 16 is a diagrammatic representation of the electrical connections employed for this construction.

This invention relates to and is an improvement on the devices illustrated, described and claimed in my companion application filed April 24, 1915, Serial Number 23,591, to which application reference hereby is made.

In the construction and mounting of the improvement as shown the numeral 10 designates generally the frame of a moving picture projector, which may be of any desired construction, said frame carrying a lamp 11, film housings 12, 13 containing a picture film 14; and other elements not shown in detail nor necessary to be here described. An auxiliary frame 15 of suitable construction is mounted on and carried by the frame 10, and is here shown as mounted below the main film and its housings; but it is to be understood that it may be mounted in any suitable relation thereto. A secondary lamp 16 is carried by the frame 15, and may be provided with any suitable conductors or connections 17. The secondary lamp 16 may be of any suitable construction but is materially smaller and dimmer than the main lamp. A magazine or housing 18 is carried by the frame 15 in front of the lamp 16, and said magazine is relatively thin and flat and is adapted to contain, removably and replaceably, a secondary or descriptive film such as 19. The film 19, which is relatively short, preferably not over twelve inches in length, bears successive items 20 of printed matter, preferably descriptive of a picture film to be shown in conjunction therewith, and said items, which preferably occupy two horizontal lines each on the film, are arranged in a vertical row from top to bottom of the film. The film 19 is adapted to pass downwardly between rollers 21, 22 rotatably mounted in the frame 15, and the roller 21 is provided with spaced toothed wheels 23 adapted to engage in marginal perforations 24 in the film to cause said film to travel, in a common manner. The roller 22 is mounted in a bearing member 25 which is connected by springs 26 to the frame 15 so as to hold the said roller 22 in light yielding contact with the roller 21, and said roller 22 is provided with annular grooves 27 for the wheels 23. The shaft of the roller 21 is provided on one end with a hand wheel 28 to permit manual turning of said roller to properly position the film 19; and the bearing member 25 is provided with a handle 29 to permit manual withdrawal of the roller 22 from the roller 21, against the action of the springs 26, for insertion of the film. A guide member 30 is removably mounted in the frame 15 in front of the projector 16, and is provided with a vertical guide 31 through which the film 19 passes in its travel. The guide 31 is provided with a transverse slot 32 of sufficient width to disclose one item 20 of the printed matter, and said items are designed to appear successively in alinement with said slot for projection on the screen, in the space indicated by the numeral 33 in Fig. 2, while the pictures to which said matter relates are shown in the space 34 at the same time. I have also provided means for synchronizing the descriptive film 19 with the main film 14; that is to say, for stepping the descriptive film forward (upward) at selected intervals during and determined by the passage of the main or picture film, for display of successive items of the descriptive matter. A bracket 35 is fixed to the frame 15 and projects below the rollers 21, 22, and a solenoid coil 36, with a hollow core, is carried in upright position by said bracket. A pawl 37, preferably composed of a brass spring, is mounted through the coil 36 and in slide bearings formed in the bracket 35, and carries on its lower end, below the coil, an armature 38 adapted to be attracted thereby. A stop 39 is formed on the pawl 37 and is adapted for engagement with the bracket 35 to limit downward movement of said pawl and the armature 38. The coil 36 has its poles connected by conductors 40 to any convenient source of electrical energy, not shown. A ratchet 41 is fixed to one end of the shaft of the roller 21 and is adapted to be engaged and actuated by the pawl 37, and a holding pawl or detent 42 preferably is pivoted to the frame 15 to engage and hold the ratchet 41 between actuating impulses. Rollers 43, 44, having metallic peripheries, are mounted for rotation in contact with each other between the housings 12, 13 and in such position that the main or picture film 14 passes between them in its travel.

The peripheries of the rollers 43, 44 are connected to the respective conductors 40 so that they are in circuit with the coil 36, and when said rollers are in contact the circuit is completed by such contact. However, when the film 14 is in position between the rollers 43, 44 they are insulated thereby from each other, so that the coil 36 is normally in broken circuit. Contact buttons 45 are mounted at selected intervals through the main or picture film 14, and are adapted, when passing between the rollers 43, 44, to complete the circuit, energize the magnet or coil 36, actuate the ratchet 41 through the attraction of the armature 38 and upward movement of the pawl 37, and cause the descriptive film 19 to be moved upward a step, thereby disclosing another item 20 of the descriptive matter. The contact buttons 45 may consist of small metallic rivets or eyelets, and their arrangement on the film 14 may be at greater or less intervals, depending upon the arrangement and pertinence of the several items 20 of descriptive matter, relative to the subject matter of the pictures. It is to be understood that the contact buttons 45 may be mounted in the film 14 between successive pictures thereon, so as not to interfere with the proper showing of the pictures.

In the modification shown in Figs. 14, 15 and 16 I have illustrated the application of the synchronizing mechanism to a plurality of devices supplementary to the main or picture film 14. These supplementary devices may comprise a descriptive film, as described above, and a phonograph, indicated conventionally at 46 in Fig. 16, adapted to reproduce spoken words relating to the pictures being shown. In this construction the roller 44 is replaced by longitudinally spaced rollers $44^a$, $44^b$, insulated from each other but on the same shaft, and said rollers $44^a$, $44^b$ contact with the roller 43 when the film is not in place. In this construction the film 14 is provided with spaced rows of contact buttons $45^a$, $45^b$, adapted to complete the circuit between the roller 43 and the rollers $44^a$, $44^b$ respectively. The roller $44^a$ may be electrically connected to the coil 36 while the roller $44^b$ is connected to the phonograph 46, which will thus be independently controlled and operated at selected intervals, either separately or conjunctively, by the travel of the picture film.

I claim as my invention—

1. A device of the class described, comprising, in combination with a moving picture machine having a picture film and means for operating the same, a supplementary film bearing vertically arranged items of descriptive matter relating to said picture film, and means actuated by the travel of the picture film for intermittently moving said descriptive film to successively disclose the items thereon.

2. A device of the class described, comprising, in combination with a moving picture machine having a picture film mounted for travel, a supplementary film bearing spaced items of descriptive matter relating to the picture film, and electrically operated mechanism controlled by the travel of the picture film for intermittently moving the descriptive film.

3. A device of the class described, comprising, in combination with a moving picture machine having a picture film mounted for travel, a supplementary film bearing items of descriptive matter relating to the picture film, and electrically operated means controlled by the travel of the picture film for moving the descriptive film.

4. A device of the class described, comprising, in combination with a moving picture machine having a picture film mounted for travel, a supplementary film bearing spaced items of descriptive matter relating to the picture film, a contact member in contact with said picture film, spaced contact points at selected intervals on said picture film, electrically operated means for intermittently moving said supplementary film, and electrical connections between said contact member and said electrically operated actuating means.

5. The combination of a moving picture machine having a picture film mounted for travel, a supplementary device relating to the subject matter of said picture film, a contact member in contact with said picture film, contact points on said film adapted to successively engage said contact member, electrically operated mechanism for actuating said supplementary device, and electrical connections between said contact member and said actuating mechanism.

6. In a moving picture machine, a film mounted for travel, a supplementary device relating to the subject matter of said film, a pair of contact members insulated from each other by said film, contact points arranged at selected intervals on said film, electrically operated mechanism for actuating said supplementary device, and electrical connections between said actuating mechanism and the respective contact members.

7. In a moving picture machine having a picture film mounted for travel, a supplementary film bearing spaced items of printed matter, a rotary member in contact with and adapted to move said supplementary film, a ratchet on said rotary member, an electro-magnet mounted adjacent said ratchet and so arranged that the armature thereof will actuate said ratchet, and means governed by the travel of said picture film for energizing said electro-magnet at selected intervals.

8. In a moving picture machine having a picture film mounted for travel, a supplementary film bearing spaced items of printed matter, a rotary member in contact with and adapted to move said supplementary film, a ratchet wheel on said rotary member, an electro-magnet having an armature adapted to engage and actuate said ratchet, a contact member contacted by said picture film during its travel, contact points at selected intervals on said picture film, and electrical connections between said contact member and electro-magnet.

9. In a moving picture machine having a picture film mounted for travel, a supplementary film bearing spaced items of printed matter, a rotary member in contact with and adapted to move said supplementary film, a ratchet wheel on said rotary member, an electro-magnet having an armature adapted to engage and actuate said ratchet wheel, a pair of contact members between which said picture film passes in its travel, contact points on said picture film, and electrical connections between said electro-magnet and the respective contact members.

Signed by me at Union, Iowa, this 14th day of July, 1915.

JOHN W. BILLINGS.

Witnesses:
A. R. BECK,
A. P. MASOY.